(12) United States Patent  (10) Patent No.: US 6,510,067 B1
Toebes  (45) Date of Patent: Jan. 21, 2003

(54) SYSTEM, METHOD AND APPARATUS FOR PROTECTING CONSUMER ELECTRONIC DEVICES FROM BROWNOUTS AND SHORT DURATION POWER OUTAGES

(75) Inventor: John Toebes, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/706,437

(22) Filed: Nov. 3, 2000

(51) Int. Cl.$^7$ .......................... H02M 1/00; H01M 10/46
(52) U.S. Cl. ........................ 363/146; 320/110
(58) Field of Search .................. 363/146, 144, 363/143, 141; 320/48, 30, 46, 43, 110, 138; 307/64, 69, 71, 81, 85

(56) References Cited

U.S. PATENT DOCUMENTS

| | | | | |
|---|---|---|---|---|
| 4,232,260 A | * | 11/1980 | Lambkin | 336/150 |
| 5,160,879 A | * | 11/1992 | Tortola et al. | 320/111 |
| 5,278,771 A | * | 1/1994 | Nyenya | 364/492 |
| 5,648,712 A | * | 7/1997 | Hahn | 320/111 |
| 5,751,564 A | | 5/1998 | Dien | |
| 5,811,895 A | * | 9/1998 | Suzuki et al. | 307/125 |
| 5,834,858 A | | 11/1998 | Crosman, III et al. | |
| 5,847,545 A | * | 12/1998 | Chen et al. | 320/138 |
| 5,872,984 A | * | 2/1999 | Berglund et al. | 395/750.08 |
| 5,920,129 A | | 7/1999 | Smith | |
| 6,121,695 A | * | 9/2000 | Loh | 307/64 |
| 6,233,343 B1 | * | 5/2001 | Muranami et al. | 381/96 |

* cited by examiner

Primary Examiner—Rajnikant B. Patel
(74) Attorney, Agent, or Firm—Baker Botts L.L.P.

(57) ABSTRACT

A self-contained power supply module operating from utility power and having short term energy storage in the form of a battery or capacitor is adapted for powering electronic consumer devices especially during brief brownout and power outages of the utility. The self-contained power supply module is a low cost power supply having an integral AC plug adapted for connection in a standard electrical wall outlet. The integral battery or capacitor provides continuous and clean power to electronic consumer devices that may lose programmed information stored therein due to brief power interruptions thereto.

76 Claims, 7 Drawing Sheets

SYSTEM, METHOD AND APPARATUS FOR PROTECTING CONSUMER ELECTRONIC DEVICES FROM BROWNOUTS AND SHORT DURATION POWER OUTAGES

BACKGROUND OF THE INVENTION

This invention relates to power modules for consumer electronic devices, and, more particularly, to a power module that is separate from the consumer electronic device and is adapted to plug into an electric power outlet and to supply a desired voltage to the consumer electronic device even during power utility brownouts and short duration power outages.

DESCRIPTION OF THE RELATED TECHNOLOGY

Consumer electronic devices shall be defined herein as electronic products or devices that may be used at home or in an office. These consumer electronic devices may be for example, but not limited to, telephones having memory storage, programmable digital alarm clocks, digital electronic address and information appliances, telephone answering machines, video game play stations, cable and satellite television interface boxes, smart modems, digital subscriber line (DSL) modems and routers, ethernet network hubs and switches, sprinkler system control panels, security card readers, security access keypad panels, programmable thermostats, garage door opener controllers, programmable door bell annunciators, etc.

Generic power supply modules typically power these consumer electronic devices and may be provided as a power supply interface between an electrical power outlet and the consumer electronic device. The generic power supply module may be either a linear or switching power supply that receives utility service line voltage and produces a lower voltage compatible with the consumer product being powered thereby. This lower voltage may be either alternating current (AC) or direct current (DC). The power supply module is typically adapted to plug into an electric wall outlet, either with a short power cord and plug cap or directly into the face of the electric outlet.

Generally, consumer electronic devices must be low cost and without unnecessary parts so as to stay competitive with other competing products. As such, non-volatile memory or expensive memory back-up systems are not included in order to maintain the cost competitiveness of these devices. Thus, the design of these devices assumes that utility power will be continuous. This, however, is not always the case and when there is a minor power dip (brownout) or short duration loss of power these devices typically loose information stored in volatile memory (lower in cost than non-volatile memory) such as registers and latches, static random access memory (SRAM), dynamic random access memory (DRAM) and the like. This information may be frequently dialed telephone numbers, time and alarm settings, time of day and date, network and router settings, local and cable television channels, television program schedules, billing information and user identity, temperature-time profiles, recorded messages, etc.

Small uninterruptible power supplies (UPS) have been used to protect larger and more expensive computer systems during a power brownout or unexpected power interruptions, but the computer components to be backed up must be within a power cord distance from the UPS. Typical UPS systems are disclosed in U.S. Pat. Nos. 5,751,564; 5,834,858; 5,811,895; and 5,920,129. The consumer electronic devices, however, are generally spread throughout the home or office, along with their respective power supply modules, thus making use of a common UPS for power backup purposes impractical.

What is needed is an inexpensive and effective way of preventing loss of information stored in volatile memory of a consumer electronic device during power brownout or short duration power interruptions.

SUMMARY OF THE INVENTION

The invention overcomes the above-identified problems as well as other shortcomings and deficiencies of existing technologies by providing an integrated power supply module comprising a power converter in combination with an energy storage device for powering a consumer electronic device and, in addition, preventing loss of information stored in volatile memory of the consumer electronic device during power brownout or short duration power interruptions. The power supply module, sometimes referred to as a "wall-wart," is adapted to plug into an electric wall outlet, either with a short power cord and plug cap or directly into the face of the electric outlet, and connect to the consumer electronic device. The power supply module converts the voltage at the wall outlet to a voltage compatible with the consumer electronic device. The power supply module may produce either alternating current (AC) or direct current (DC), depending on the requirements of the consumer electronic device. The storage device may be a battery, a rechargeable battery or a capacitor adapted so as to provide power through the power supply module to the consumer electronic device during a power utility brownout or short duration loss of power. In addition, it is contemplated and within the scope of the invention that transient voltage protection may also be incorporated in combination with the power supply module and energy storage device.

In an embodiment of the invention the power module is encased in some form of insulated enclosure in compliance with UL$^{(R)}$ and/or CSA standards. The enclosure may have a two pin male connector which is integral therewith, or a power cord and plug cap (two pin male connector). The male connector is adapted to mate with contacts in the wall receptacle so as to make electrical connection thereto and also derive mechanical support therefrom. A three pin male connector which is integral therewith, and a power cord and plug cap (three pin male connector) having a safety ground connection are also contemplated herein. The three pin male connector embodiment of the invention may also be encased in a metal enclosure attached to the grounding pin of the three pin male connector.

The energy storage device is integral with the power module enclosure. The energy storage device may be located on the inside or outside of the enclosure, and may be fixed in or on, and/or removable from the enclosure. When the energy storage device is a rechargeable battery, circuits of the power converter in the power supply module may be used to recharge this rechargeable battery when utility power is present so as to maintain a full charge therein.

The power supply module may be adapted for a removable rechargeable or non-rechargeable battery or batteries and may have an appropriate battery holder or compartment that may physically retain the battery or batteries and have an electrical connector or contacts integral or associated therewith that is adapted for making electrical connection to the battery or batteries.

A battery charge or condition indicator may be included with the power supply module and may be, for example, but not limited to, a light for indicating charge state or discharge state when a non-rechargeable battery is used. A tone or pulsed tone (beep) may also be used instead of or in addition to the indicator light, for signaling a low battery charge condition. Any signaling device may be used to indicate the need to replace a non-rechargeable battery.

Battery condition status may also be transmitted to the consumer electronic device by, for example, but not limited to, an infrared transmitter, carrier current signal on the power supply wiring, a USB port, etc.

The present invention may be utilized with existing consumer electronic devices as a replacement component for an existing power supply module so as to prevent or reduce brownout and/or loss of power related mis-operation and/or failures of the consumer electronic device. Many different types and models of consumer electronic devices may be powered by the present invention, thereby improving economics of scale and reducing manufacturing costs thereof.

An advantage of the present invention is compatibility with existing and future consumer electronic devices.

Another advantage is simplification of the design and reduction of the cost of consumer electronic devices.

Still another advantage is improved operation and reduced malfunctions of consumer electronic devices.

Another advantage is low cost through mass production for use with a plurality of different consumer electronic devices.

A feature of the present invention is an energy storage device for preventing brownout and short duration loss of power in a consumer electronic device.

Another feature is a removable battery.

Still another feature is a low battery charge indicator.

Yet another feature is a rechargeable battery that is automatically charged by the power converter in the power supply module when the connected utility power is operational.

Other and further advantages and features will be apparent from the following description of presently preferred embodiments of the invention, given for the purpose of disclosure and taken in conjunction with the accompanying drawings.

DETAILED DESCRIPTION OF THE PREFERRED EMBODIMENTS

Figure 1:
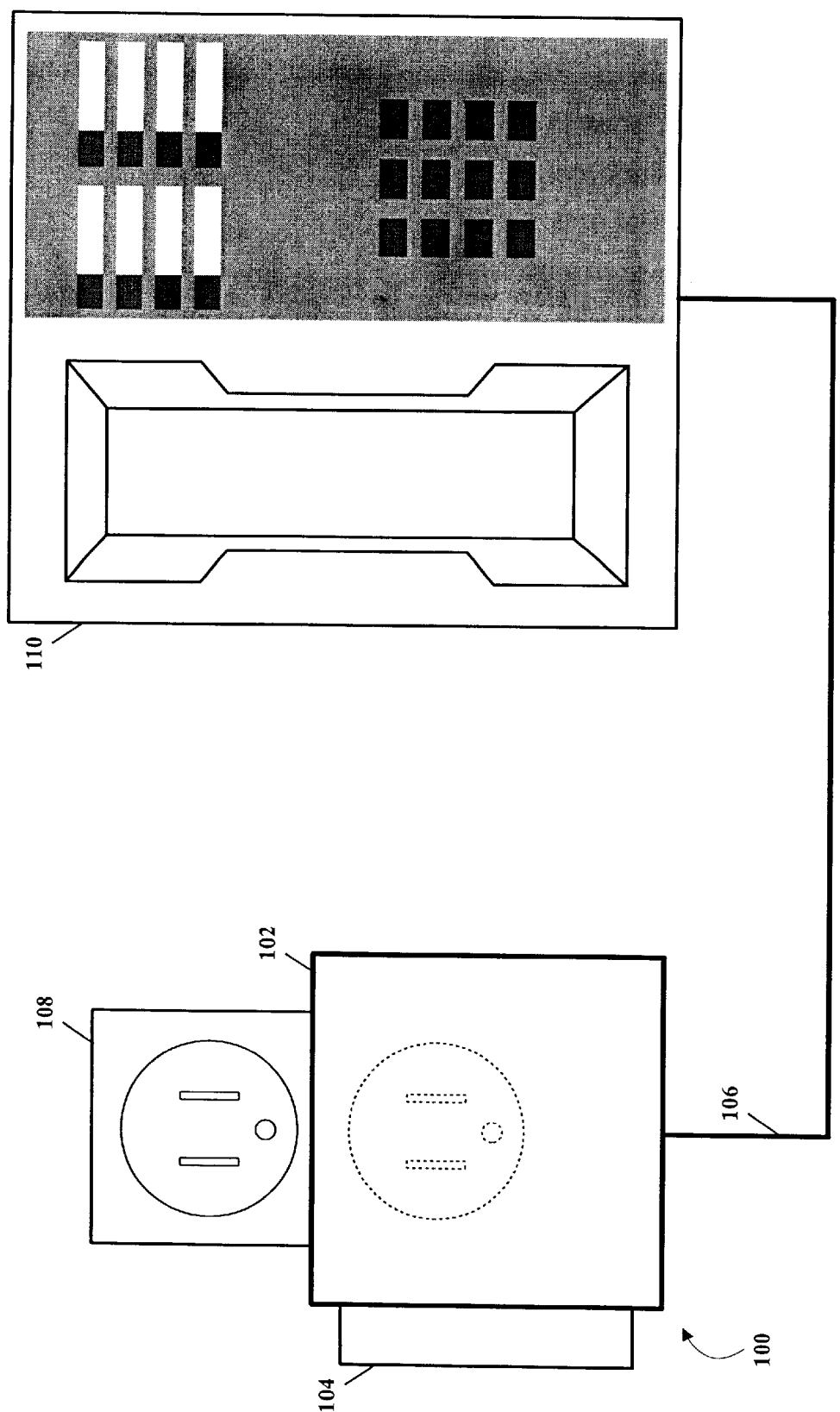
FIG. 1 is a schematic diagram of a consumer electronic device powered by a power supply module having a removable battery, according to an embodiment of the invention.

The invention is a power supply module comprising a power converter and an energy storage device. The power supply module is used to power a consumer electronic device and to prevent loss of information stored in volatile memory of the consumer electronic device during power brownout or short duration power interruptions. Voltage transient protection may be incorporated into the power supply module. Indication of battery status or condition may also be incorporated into the power supply module, according to an embodiment of the present invention. The present invention may have an input that operates over a wide range of utility utilization voltages, typically from about 100 volts to about 250 volts, preferably from about 110 volts to about 125 volts, and most preferably about 117 volts. Other utility utilization voltages may be used with the present invention and are contemplated herein. An output voltage for the consumer electronic device may be supplied from about 5 volts to 48 volts, preferably from about 8 volts to about 24 volts, and most preferably from about 9 volts to about 15 volts.

Referring now to the drawings, the details of preferred embodiments of the invention are schematically illustrated. Like elements in the drawings will be represented by like numbers, and similar elements will be represented by like numbers with a different lower case letter suffix.

Referring to FIG. 1, a schematic diagram of a consumer electronic device powered by a power supply module having a removable battery is illustrated. The power supply module of FIG. 1 is generally represented by the numeral 100. The power supply module 100 comprises a power converter 102 and a removable battery 104. The power supply module 100 is adapted to be plugged into a wall power receptacle 108 and connected to a consumer electronic device 110. The power supply module 100 supplies operating power to the consumer electronic device 110. The removable battery 104 may be any of the commonly used consumer type batteries such as, for example, but not limited to, one or more A or AA batteries in a battery holder, a 9 volt battery having snap connections thereon, etc. The removable battery 104 may be non-rechargeable carbon, alkaline or the like, or the battery may be rechargeable nickel cadmium, lead acid, and the like.

Figure 2A:
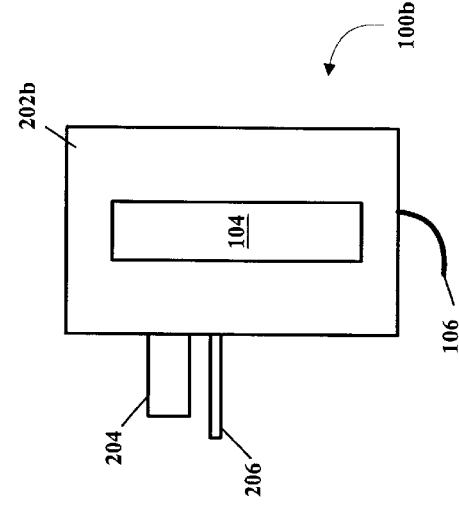
FIGS. 2A and 2C are schematic side views of embodiments of the power supply module of FIG. 1.
Figure 2B:
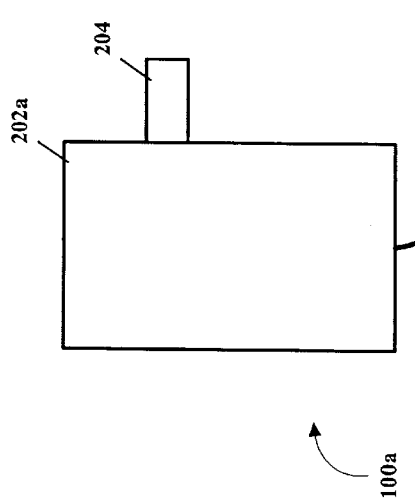
FIGS. 2B and 2D are schematic rear views of embodiments of the power supply module of FIGS. 2A and 2C, respectively.

Referring to FIGS. 2A and 2B, schematic side and rear views of a power supply module are illustrated, according to an embodiment of the present invention. The power supply module 100a comprises a housing 202a, male plug contacts 204 and a power cable 106 adapted to connect to the consumer electronic device 110. Generally, the power cable 106 has a plug connector that mates with a corresponding socket in the consumer electronic device 110. The housing 202a is generally made of an insulating material which meets the requirements of UL and CSA as being a "double insulated enclosure" not requiring grounding. The male plug contacts 204 are further identified in FIG. 2B as contacts 204a and 204b, representing "ungrounded" and "neutral" plug contacts adapted for the corresponding contacts of the wall outlet socket 108 (FIG. 1). An internal energy storage device 304 (FIG. 3), such as a rechargeable battery or capacitor may be contained in the housing 202a in combination with the power converter 102 (FIG. 1).

Figure 2C:
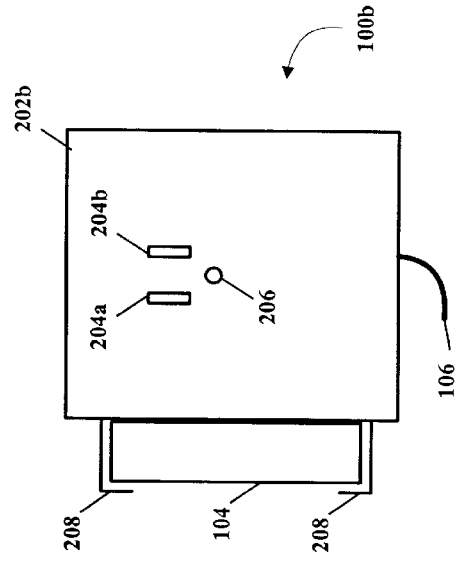
Figure 2D:
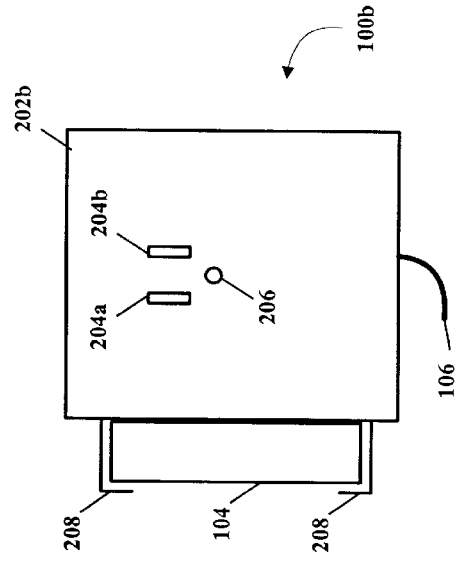

Referring to FIGS. 2C and 2D, schematic side and rear views of a power supply module are illustrated, according to another embodiment of the present invention. The power supply module 100b comprises a housing 202b and male plug contacts 204 and 206. The housing 202b is generally made of either an insulating or conductive material. To meet the requirements of UL and CSA, the power supply module 100b must be grounded through the contact 206 which is adapted for connection to the grounding contact of the wall outlet socket 108 (FIG. 1). The male plug contacts 204 are further identified in FIG. 2D as contacts 204a and 204b, representing "ungrounded" and "neutral" plug contacts adapted for the corresponding contacts of the wall outlet socket 108. A battery holder 208 is provided on the exterior surface of the housing 202b for removably holding the battery 104.

Figure 2F:
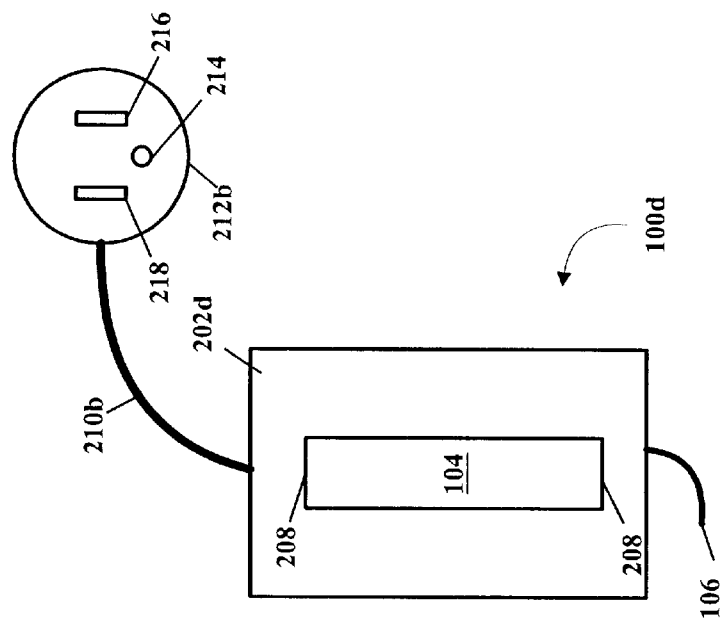
FIGS. 2E and 2F are schematic side views of other embodiments of the invention.
Figure 2E:
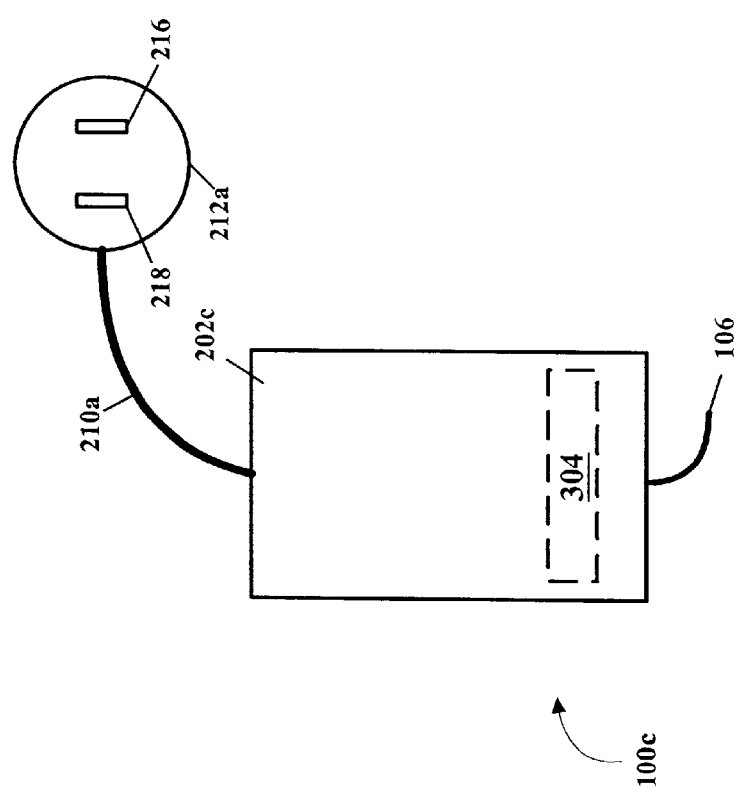

Referring to FIG. 2E, a schematic side view of a power supply module is illustrated, according to yet another embodiment of the present invention. The power supply module 100c comprises a housing 202c, a two wire power cord 210a having a male plug cap 212a adapted to plug into the wall outlet socket 108 (FIG. 1), and a power cable 106 adapted to connect to the consumer electronic device 110 (FIG. 1). The male plug cap 212a has contacts 216 and 218, representing "ungrounded" and "neutral" plug contacts, respectively, adapted for the corresponding contacts of the wall outlet socket 108. Generally, the power cable 106 has a plug connector that mates with a corresponding socket in the consumer electronic device 110. The housing 202c is generally made of an insulating material which meets the requirements of UL and CSA as being a "double insulated enclosure" not requiring grounding. An internal energy storage device 304 (FIG. 3), such as a rechargeable battery or capacitor may be contained in the housing 202c in combination with the power converter 102 (FIG. 1).

Referring to FIG. 2F, a schematic side view of a power supply module is illustrated, according to still another embodiment of the present invention. The power supply module 100d comprises a housing 202d, a three wire power cord 210b having a male plug cap 212b adapted to plug into the wall outlet socket 108, and a power cable 106 adapted to connect to the consumer electronic device 110. The housing 202d is generally made of either an insulating or conductive material. To meet the requirements of UL and CSA, the power supply module 100d must be grounded through the plug cap 212b contact 214 which is adapted for connection to the grounding contact of the wall outlet socket 108 (FIG. 1). The male plug cap 212b also has contacts 216 and 218, representing "ungrounded" and "neutral" plug contacts, respectively, adapted for the corresponding contacts of the wall outlet socket 108. A battery holder 208 may be provided on the exterior surface of the housing 202d for removably holding the battery 104.

Figure 3:
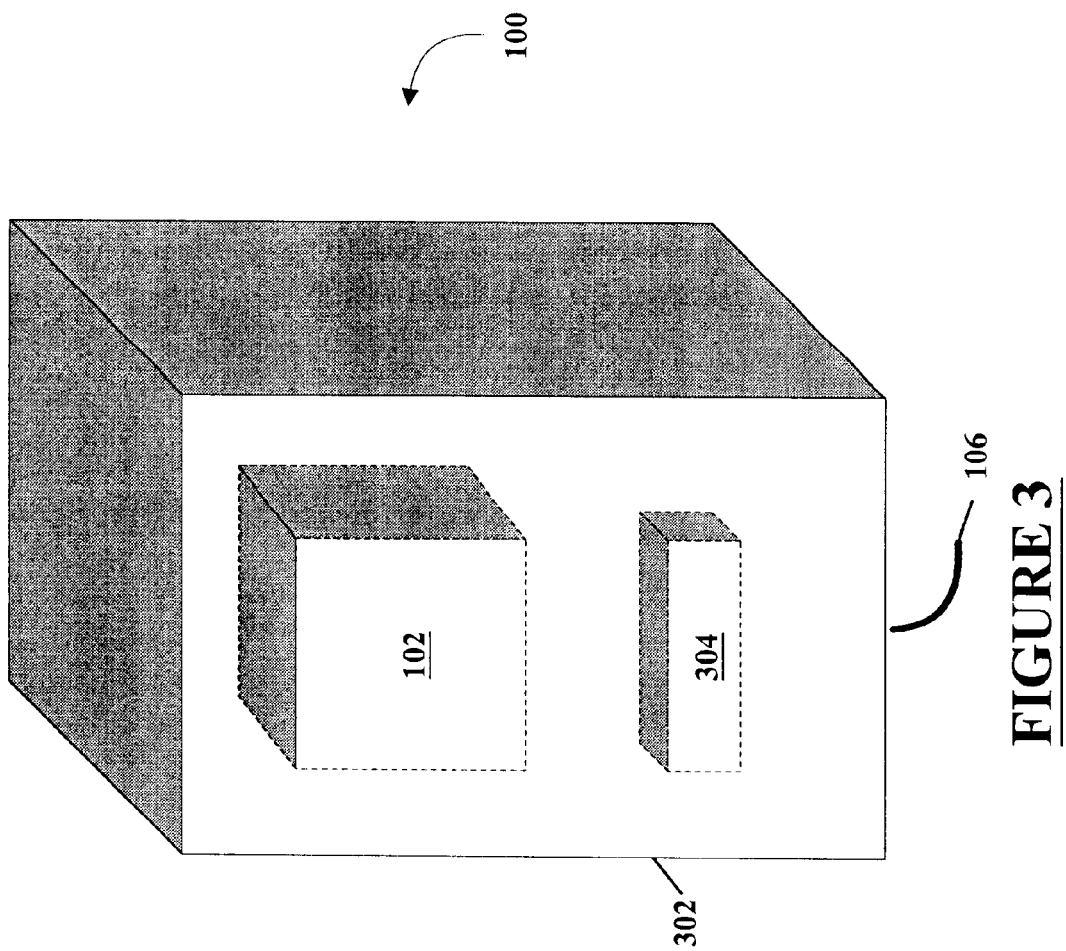
FIG. 3 is a schematic block perspective diagram of another embodiment of the invention having an internal battery.

Referring now to FIG. 3, another embodiment of the invention having an internal energy storage device is illustrated. The power supply module 100 comprises a housing 302 enclosing the power converter 102 and an internal energy storage device 304. The internal energy storage device 304 may be a rechargeable battery or a capacitor. The rechargeable battery may be any type know to one of ordinary skill in the art of batteries. The capacitor is of sufficient energy storage capacity to sustain the consumer electronic device through a short duration brownout or loss of utility power. The power converter 102 is adapted to charge the rechargeable battery (energy storage device 304) when the utility power is functional, and is further adapted to be powered from the rechargeable battery when there is a utility brownout or power failure.

Figure 4:
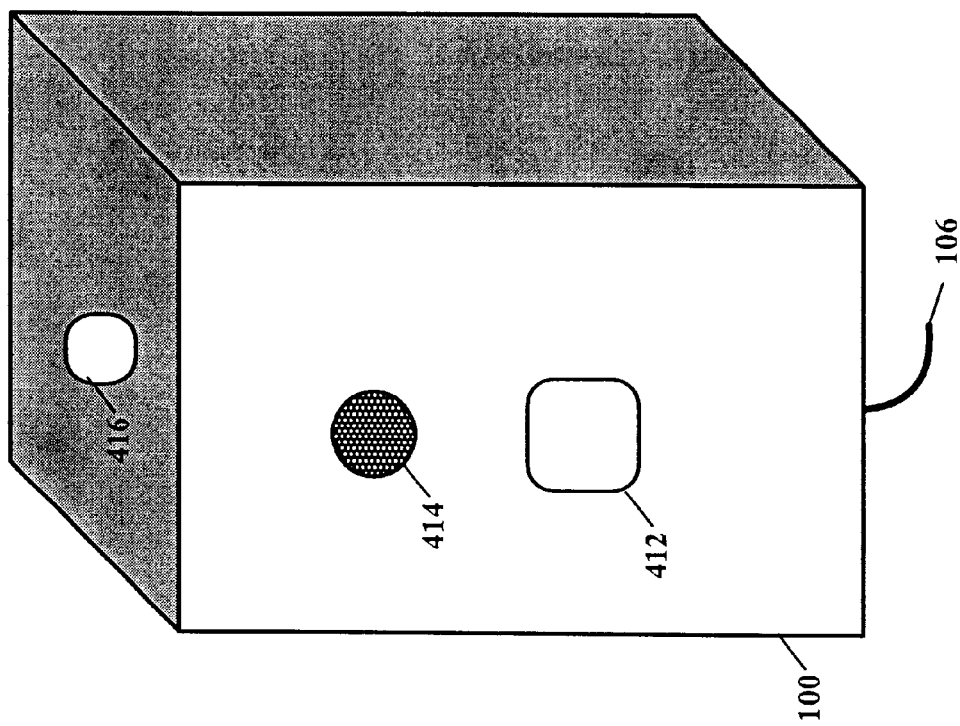
FIG. 4 is a schematic front view illustrating battery status indication.

Referring to FIG. 4, a schematic front view of battery status indication is illustrated. The power supply module 100 may have a battery status indicator, for example, but not limited to, a light 414 and/or an audible alarm 412. The battery status indicator may represent a low charge condition for the battery 104 (FIG. 1) which may indicate that a non-rechargeable battery requires replacement, or that a rechargeable battery requires recharging. The light 414 may light-up, flash on and off, change color, etc., and the audible alarm may beep, warble, have a steady tone, etc.

It is contemplated and within the scope of the present invention that digital signaling may also be incorporated to indicate the status of the power converter 102 and/or the energy storage device 304. A carrier current signal on the power cable 106 to the consumer electronic device 110, an additional signal wire(s) in the power cable 106, a digital port 416 such as universal serial bus (USB) may be adapted to connect to the consumer electronic device 110. Any of type of signal circuit known to one of ordinary skill in the art may be used to alert the consumer electronic device 110 that there has been a utility power brownout or power failure. Once alerted by the signal circuit (not illustrated), the consumer electronic device 110 may take evasive action (save critical data, go offline, etc.) in the event that the power failure time duration may exceed the capabilities of the power supply module 100 to maintain proper operating voltage therefor.

Figure 5:
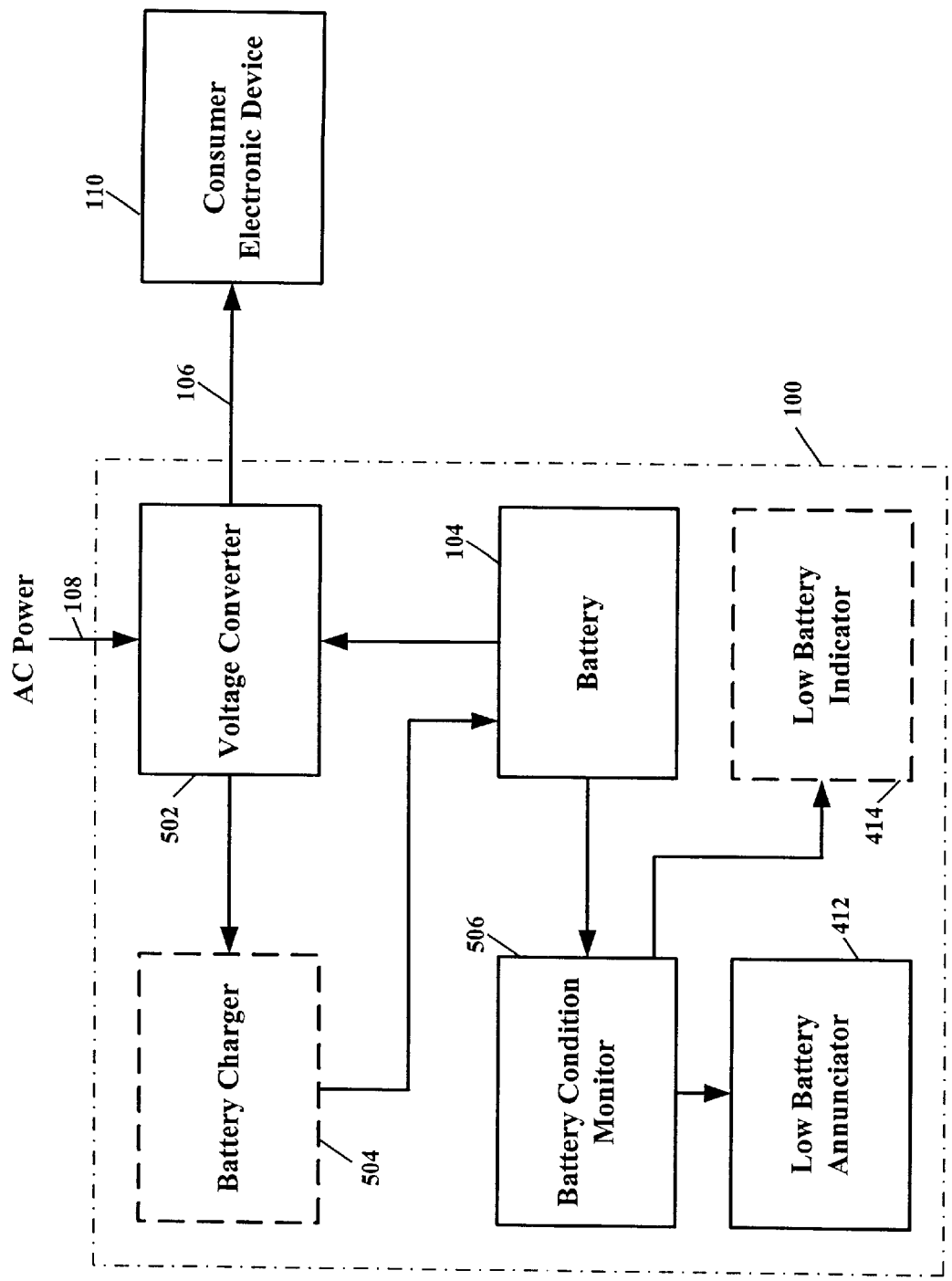
FIG. 5 is a schematic functional block diagram of an embodiment of the invention.

Referring to FIG. 5, a schematic functional block diagram of an embodiment of the invention is illustrated. The power supply module 100 comprises a voltage converter 502, a battery 104, a battery charger 504 (when a rechargeable battery is used), a battery condition monitor 506, a low battery annunciator 412 and/or a low battery indicator 414. In normal operation, the voltage converter 502 receives power from the utility (power receptacle 108 of FIG. 1) and converts the utility voltage at, for example, 60 Hertz alternating current (AC) into a desired voltage and either an AC or direct current (DC) to operate the consumer electronic device 110. The consumer electronic device 110 functions correctly so long as there is voltage being supplied thereto. The battery condition monitor 506 monitors the charge state of the battery 104 and may be adapted for controlling the low battery annunciator 412 and/or low battery indicator 414 depending upon the charge condition of the battery 104.

The power supply module 100 normally supplies power to the consumer electronic device 110 from the power receptacle 108, but when there is a voltage brownout or short term voltage loss then power is obtained from the battery 104 and converted by the voltage converter 502 to the desired voltage and current values required by the consumer electronic device 110. Depending upon the energy storage capacity of the battery 104, the consumer electronic device 110 will correctly operate for a desired time without the utility power being present at the power receptacle 108. The voltage converter 502 is designed to transfer its source of power from the power receptacle 108 to the battery 104. Any circuit known to one of ordinary skill in the design of battery backup power supplies may be adapted for the voltage converter 502. A typical circuit is disclosed in U.S. Pat. No. 5,811,895, entitled "Power Supply Circuit for Use with a Battery and an AC Power Adaptor" by Suzuki et al., and is hereby incorporated by reference.

Figure 6:
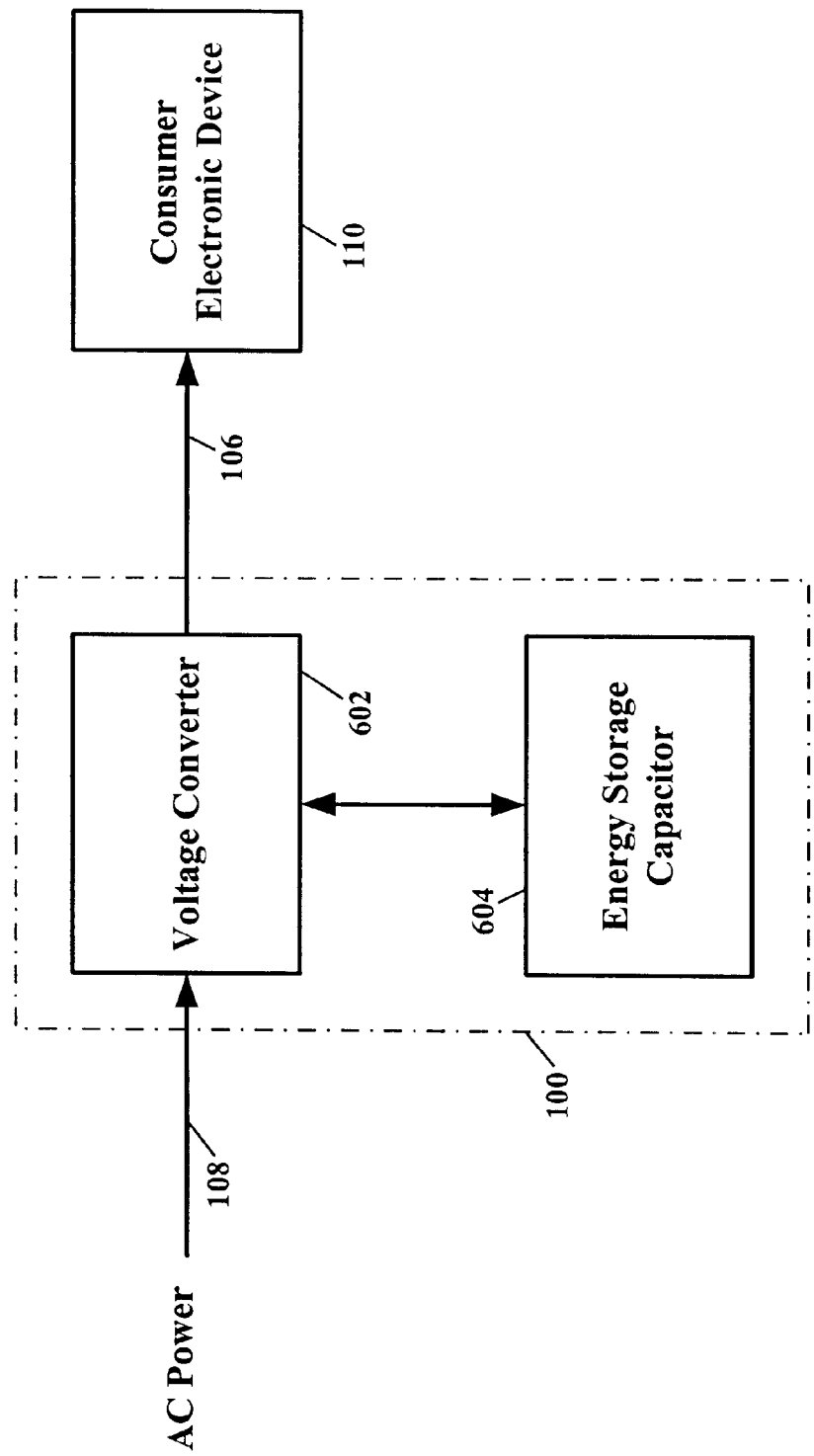
FIG. 6 is a schematic functional block diagram of another embodiment of the invention.

Referring to FIG. 6, a schematic functional block diagram of another embodiment of the invention is illustrated. The power supply module 100 comprises a voltage converter 602 and an energy storage capacitor 604. In normal operation, the voltage converter 602 receives power from the utility (power receptacle 108 of FIG. 1) and converts the utility voltage at, for example, 60 Hertz alternating current (AC) into a desired voltage and either an AC or direct current (DC) to operate the consumer electronic device 110. The consumer electronic device 110 functions correctly so long as there is voltage being supplied thereto.

The power supply module 100 normally supplies power to the consumer electronic device 110 from the power receptacle 108, but when there is a voltage brownout or short term voltage loss then power is obtained from the energy storage capacitor 604 and converted by the voltage converter 602 to the desired voltage and current values required by the consumer electronic device 110. Depending upon the energy storage capacity of the energy storage capacitor 604, the consumer electronic device 110 will correctly operate for a desired time without the utility power being present at the power receptacle 108. The voltage converter 602 is designed to draw power from the energy storage capacitor 604 during the brief periods of time of a brownout or short duration voltage dip at the power receptacle 108. The circuit of the voltage converter 602 may be an AC to DC converter, which charges the energy storage capacitor 604 with a DC voltage and which may reconvert the DC voltage back to a desired AC voltage for the consumer electronic device 110. If the consumer electronic device 110 operates from a DC voltage, the voltage converter 602 need only produce this DC voltage which simultaneously charges the energy storage capacitor 604 and powers the consumer electronic device 110.

It is contemplated and within the scope of the present invention that transient voltage and/or surge current protection may be incorporated with any or all of the aforementioned embodiments. This aspect of the invention further improves the robustness of the power supply module 100 to abnormal operating conditions.

The invention, therefore, is well adapted to carry out the objects and attain the ends and advantages mentioned, as well as others inherent therein. While the invention has been depicted and described and is defined by reference to particular preferred embodiments of the invention, such references do not imply a limitation on the invention, and no such limitation is to be inferred. The invention is capable of considerable modification, alternation and equivalents in form and function, as will occur to those ordinarily skilled in the pertinent arts. The depicted and described preferred embodiments of the invention are exemplary only and are not exhaustive of the scope of the invention. Consequently, the invention is intended to be limited only by the spirit and scope of the appended claims, giving full cognizance to equivalents in all respects.

What is claimed is:

1. An apparatus for protecting consumer electronic devices from brownouts and short duration power outages, comprising:

a power converter;

an energy storage device;

power plug prongs adapted for insertion into a standard power outlet;

a power cable adapted for connection to a power input of a separate consumer electronic device; and a housing, the housing enclosing the power converter and the energy storage device, the power plug prongs are fixedly attached to a side of the housing and the power cable is fixedly attached to another side of the housing;

whereby the power converter is adapted to receive power from the standard power outlet through the power plug prongs when a normal operating voltage is present thereon and from the energy storage device when the normal operating voltage is not present on the power plug prongs, the power converter operable to convert power received from either the power plug prongs or the energy storage device into a compatible voltage and current for transfer to a consumer electronic device over the power cable.

2. The power supply module of claim 1, wherein the power converter converts an alternating current input to a direct current output.

3. The power supply module of claim 1, wherein the power converter converts an alternating current input to an alternating current output.

4. The power supply module of claim 1, wherein the power converter converts a first voltage input to a second voltage output.

5. The power supply module of claim 4, wherein the first voltage is from about 100 volts to about 250 volts and the second voltage is from about 5 volts to about 48 volts.

6. The power supply module of claim 4, wherein the first voltage is from about 110 volts to about 125 volts and the second voltage is from about 8 volts to about 24 volts.

7. The power supply module of claim 4, wherein the first voltage is about 117 volts and the second voltage is from about 9 volts to about 15 volts.

8. The power supply module of claim 1, wherein the energy storage device is a battery.

9. The power supply module of claim 1, wherein the energy storage device is a capacitor.

10. The power supply module of claim 1, wherein the energy storage device is a rechargeable battery.

11. The power supply module of claim 10, wherein the power converter charges the rechargeable battery.

12. The power supply module of claim 1, wherein the housing is double insulated and the power plug contacts are adapted for connection to a neutral and an ungrounded circuit of the power outlet.

13. The power supply module of claim 1, wherein the power plug contacts are adapted for connection to a neutral, an ungrounded and a grounding circuit of the power outlet.

14. The power supply module of claim 13, wherein the housing is connected to a one of the power plug contacts which is adapted for connection to the grounding circuit of the power outlet.

15. The power supply module of claim 8, further comprising a battery holder attached to the housing, wherein the battery is removably connected to the battery holder.

16. The power supply module of claim 9, wherein the capacitor is enclosed in the housing.

17. The power supply module of claim 10, wherein the rechargeable battery is enclosed in the housing.

18. The power supply module of claim 1, further comprising an energy storage device status indicator which indicates a charge condition of the energy storage device.

19. The power supply module of claim 18, wherein the energy storage device status indicator is a light.

20. The power supply module of claim 18, wherein the energy storage device status indicator is a flashing light.

21. The power supply module of claim 18, wherein the energy storage device status indicator is an audio tone generator.

22. The power supply module of claim 18, wherein the energy storage device status indicator is a pulsating audio tone generator.

23. The power supply module of claim 1, further comprising an energy storage device status signal which indicates a charge condition of the energy storage device and is adapted to signal a status to the consumer electronic device.

24. The power supply module of claim 8, further comprising a battery condition monitor for monitoring the charge condition of the battery.

25. The power supply module of claim 24, further comprising a low battery annunciator connected to the battery condition monitor and adapted to send an alert signal when the battery is in a low charge condition.

26. The power supply module of claim 24, further comprising a low battery indicator light connected to the battery condition monitor and adapted to light up when the battery is in a low charge condition.

27. The power supply module of claim 26, wherein the low battery indicator light flashes on and off when the battery is in a low charge condition.

28. The power supply module of claim 10, further comprising a battery charger enclosed in the housing and adapted to charge the rechargeable battery.

29. A method for protecting consumer electronic devices from brownouts and short duration power outages, the method comprising the steps of:
provides a power supply module comprising a power converter and an energy storage device connected thereto and enclosed in a housing separate from the consumer electronic device, wherein the housing includes power plug prongs adapted for insertion into a wall power outlet and provides power to a consumer electronic device over a power cable such that the power converter is adapted to receive power from the power plug prongs when a normal operating voltage is present thereon and from the energy storage device when the normal operating voltage is not present and converts the received power into a compatible voltage and current for transfer to a consumer electronic device over the power cable.

30. The method of claim 29, further comprising the step of charging the energy storage device.

31. The method of claim 29, further comprising the step of indicating a low charge on the energy storage device.

32. The method of claim 29, further comprising the step of annunciating a low charge on the energy storage device.

33. A system for protecting consumer electronic devices from brownouts and short duration power outages, the system comprising:
means for converting power;
means for storing energy;
means for connecting the power converting means to a standard power outlet;
means for connecting the power converting means to a power input of a consumer electronic device; and
means for enclosing the power converting means and the energy storage means, the enclosing means providing the standard power outlet connecting means and the power input connecting means whereby the power converting means is adapted to receive power from the standard power outlet connecting means when a normal operating voltage is present thereon and from the energy storage means when the normal operating voltage is not present and converting the received power into a compatible voltage and current for transfer to a consumer electronic device over the power input connecting means.

34. The system of claim 33, wherein the power converting means converts an alternating current input to a direct current output.

35. The system of claim 33, wherein the power converting means converts an alternating current input to an alternating current output.

36. The system of claim 33, wherein the power converting means converts a first voltage input to a second voltage output.

37. The system of claim 36, wherein the first voltage is from about 100 volts to about 250 volts and the second voltage is from about 5 volts to about 48 volts.

38. The system of claim 36, wherein the first voltage is from about 110 volts to about 125 volts and the second voltage is from about 8 volts to about 24 volts.

39. The system of claim 36, wherein the first voltage is about 117 volts and the second voltage is from about 9 volts to about 15 volts.

40. The system of claim 33, wherein the energy storage means is a battery.

41. The system of claim 33, wherein the energy storage means is a capacitor.

42. The system of claim 33, wherein the energy storage means is a rechargeable battery.

43. The system of claim 42, wherein the power converting means charges the rechargeable battery.

44. The system of claim 33, wherein the enclosure means is double insulated.

45. The system of claim 33, wherein the means for connecting the power converting means to the power outlet comprises means for connecting to a neutral, an ungrounded and a grounding circuit of the power outlet.

46. The system of claim 45, wherein the enclosure means is connected to the grounding circuit of the power outlet.

47. The system of claim 40, further comprising means for holding the battery and means for attached the battery holding means to the enclosure means, wherein the battery is removably connected to the battery holding means.

48. The system of claim 41, wherein the capacitor is enclosed in the enclosure means.

49. The system of claim 42, wherein the rechargeable battery is enclosed in the enclosure means.

50. The system of claim 33, further comprising a means for indicating energy storage status of a charge condition of the energy storage means.

51. The system of claim 50, wherein the energy storage device status indicating means is a means for producing light.

52. The system of claim 50, wherein the energy storage device status indicating means is a means for producing a flashing light.

53. The system of claim 50, wherein the energy storage device status indicating means is a means for producing an audio tone.

54. The system of claim 50, wherein the energy storage device status indicating means is a means for producing a pulsating audio tone.

55. The system of claim 33, further comprising a means for signaling an energy storage status which indicates a charge condition of the energy storage means and is adapted to signal a status to the consumer electronic device.

56. The system of claim 40, further comprising means for monitoring a charge condition of the battery.

57. The system of claim 56, further comprising means for annunciating a low charge condition of the battery and adapted to send an alert signal when the battery is in a low charge condition.

58. The system of claim 56, further comprising means for indicating a low charge condition of the battery and adapted to light up when the battery is in a low charge condition.

59. The system of claim 58, wherein the low battery charge condition indicator means flashes a light on and off when the battery is in a low charge condition.

60. The system of claim 42, further comprising a means for charging the rechargeable battery charger in the enclosure means.

61. The power supply module of claim 1, further comprising voltage transient and surge protection.

62. The method of claim 29, further comprising the step of providing voltage transient and surge protection.

63. The system of claim 33, further comprising means for voltage transient and surge protection.

64. An apparatus for protecting consumer electronic devices from brownouts and short duration power outages, comprising:
- a power converter;
- an energy storage device;
- a plug and cord having contacts adapted for connection to a standard power outlet;
- a power cable adapted for connection to a power input of a consumer electronic device; and
- a housing, the housing enclosing the power converter and attached to the energy storage device, wherein the plug and cord and the power cable are fixedly attached to the housing, whereby the power converter is adapted to receive power from the standard power outlet through the plug and cord when a normal operating voltage is present thereon and from the energy storage device when the normal operating voltage is not present and converts the received power into a compatible voltage and current for transfer to a consumer electronic device over the power cable.

65. The power supply module of claim 64, wherein the plug and cord is two wire.

66. The power supply module of claim 64, wherein the plug and cord is three wire.

67. The power supply module of claim 64, wherein the energy storage device is a battery.

68. The power supply module of claim 64, wherein the energy storage device is a capacitor.

69. The power supply module of claim 64, wherein the energy storage device is a rechargeable battery.

70. The power supply module of claim 69, wherein the power converter charges the rechargeable battery.

71. The power supply module of claim 64, wherein the housing is double insulated and the plug and cord contacts are adapted for connection to a neutral and an ungrounded circuit of the power outlet.

72. The power supply module of claim 64, wherein the plug and cord contacts are adapted for connection to a neutral, an ungrounded and a grounding circuit of the power outlet.

73. The power supply module of claim 67, further comprising a battery holder attached to the housing, wherein the battery is removably connected to the battery holder.

74. The power supply module of claim 68, wherein the capacitor is enclosed in the housing.

75. The power supply module of claim 69, wherein the rechargeable battery is enclosed in the housing.

76. The power supply module of claim 64, further comprising an energy storage device status indicator which indicates a charge condition of the energy storage device.

* * * * *